(12) United States Patent
Choi et al.

(10) Patent No.: US 11,176,946 B2
(45) Date of Patent: *Nov. 16, 2021

(54) METHOD AND APPARATUS FOR SPEECH RECOGNITION

(71) Applicant: Samsung Electronics Co., Ltd., Suwon-si (KR)

(72) Inventors: Heeyoul Choi, Hwaseong-si (KR); Hoshik Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

This patent is subject to a terminal disclaimer.

(21) Appl. No.: 15/946,840

(22) Filed: Apr. 6, 2018

(65) Prior Publication Data
US 2018/0226078 A1 Aug. 9, 2018

Related U.S. Application Data

(63) Continuation of application No. 14/870,963, filed on Sep. 30, 2015, now Pat. No. 9,940,933.

(30) Foreign Application Priority Data

Dec. 2, 2014 (KR) .......................... 10-2014-0170818

(51) Int. Cl.
*G10L 15/32* (2013.01)
*G10L 15/183* (2013.01)
(Continued)

(52) U.S. Cl.
CPC ............ *G10L 15/32* (2013.01); *G10L 15/183* (2013.01); *G10L 15/16* (2013.01); *G10L 15/187* (2013.01); *G10L 15/197* (2013.01)

(58) Field of Classification Search
CPC ... G06F 17/274; G10L 15/26; G10L 15/1815; G10L 15/183; G10L 15/19; G10L 15/00
See application file for complete search history.

(56) References Cited

U.S. PATENT DOCUMENTS 5,864,805 A * 1/1999 Chen .................. G10L 15/22
704/235
6,041,299 A 3/2000 Schuster et al.
(Continued)

FOREIGN PATENT DOCUMENTS

| JP | 2004-101963 A | 4/2004 |
| JP | 2005-84436 A | 3/2005 |
| KR | 10-2012-0038198 A | 4/2012 |

OTHER PUBLICATIONS

Tam, Cheung-Yik et al., "ASR Error Detection Using Recurrent Neural Network Language Model and Complementary ASR", *IEEE Interntational Conference on Acoustic, Speech and Signal Processing (ICASSP)*, 2014, pp. 2312-2316 (5 pages in English).
(Continued)

*Primary Examiner* — Richemond Dorvil
*Assistant Examiner* — Mark Villena
(74) *Attorney, Agent, or Firm* — NSIP Law

(57) ABSTRACT

A speech recognition method includes receiving a sentence generated through speech recognition, calculating a degree of suitability for each word in the sentence based on a relationship of each word with other words in the sentence, detecting a target word to be corrected among the words in the sentence based on the degree of suitability for each word, and replacing the target word with any one of candidate words corresponding to the target word.

20 Claims, 19 Drawing Sheets

(51) Int. Cl.
*G10L 15/197* (2013.01)
*G10L 15/187* (2013.01)
*G10L 15/16* (2006.01)

(56) References Cited

U.S. PATENT DOCUMENTS

| | | | |
|---|---|---|---|
| 6,167,377 A | 12/2000 | Gillick et al. | |
| 7,716,050 B2 | 5/2010 | Gillick et al. | |
| 8,204,739 B2 | 6/2012 | Waibel et al. | |
| 8,260,615 B1* | 9/2012 | Nakajima | G10L 15/183 704/257 |
| 9,324,323 B1* | 4/2016 | Bikel | G10L 15/183 |
| 2002/0091520 A1* | 7/2002 | Endo | G06K 9/72 704/235 |
| 2006/0293889 A1 | 12/2006 | Kiss et al. | |
| 2007/0033026 A1 | 2/2007 | Bartosik et al. | |
| 2009/0326938 A1* | 12/2009 | Marila | G10L 15/22 704/235 |
| 2010/0070277 A1* | 3/2010 | Arakawa | G10L 15/02 704/246 |
| 2010/0138210 A1* | 6/2010 | Seo | G06F 17/273 704/2 |
| 2012/0089387 A1* | 4/2012 | Gamon | G06F 17/274 704/9 |
| 2012/0232904 A1* | 9/2012 | Zhu | G10L 15/22 704/254 |
| 2012/0290298 A1 | 11/2012 | Ljolje et al. | |
| 2013/0018649 A1 | 1/2013 | Deshmukh et al. | |
| 2013/0030804 A1* | 1/2013 | Zavaliagkos | G10L 15/26 704/235 |
| 2013/0317822 A1 | 11/2013 | Koshinaka | |
| 2014/0039888 A1 | 2/2014 | Taubman et al. | |
| 2014/0188460 A1* | 7/2014 | Ouyang | G06F 17/2735 704/9 |
| 2014/0214401 A1* | 7/2014 | Li | G06F 17/273 704/8 |
| 2014/0372122 A1* | 12/2014 | Harsham | G10L 15/22 704/257 |
| 2015/0095026 A1* | 4/2015 | Bisani | G10L 15/08 704/232 |
| 2015/0179169 A1* | 6/2015 | John | G10L 15/1815 704/257 |
| 2015/0332673 A1* | 11/2015 | Li | G06F 17/276 704/235 |

OTHER PUBLICATIONS

European Office Action dated Feb. 26, 2019 in Corresponding Application No. 15193814.9 (13 pages in English).
R. Schwartz et al., "New Uses for the N-Best Sentence Hypotheses within the BYBLOS Speech Recognition System," *Proceedings from the IEEE International Conference on Acoustics, Speech, and Signal Processing*, San Francisco, CA, Mar. 1992, vol. 1, pp. 1-4.
Graves et al., "Hybrid speech recognition with deep bidirectional LSTM." *IEEE Workshop on Automatic Speech Recognition and Understanding* (ASRU), Dec. 2013, pp. 273-278.
Extended European Search Report dated Feb. 9, 2016 in counterpart European Application No. 15193814.9 (8 pages in English).
Ogawa, A et al., "ASR Error Detection and Recognition Rate Estimation Using Deep Bidirectional Recurrent Neural Networks", *IEEE International Conference on Acoustics, Speech and Signal Processing (ICASSP)*, 2015, pp. 4370-4374 (5 pages in English).
Japanese Office Action dated Dec. 3, 2019 in the Corresponding Japanese Patent Application No. 2015-210588 (5 pages in English, 5 pages in Japanese).

* cited by examiner

FIG. 9A

Today my mom sought me a story
↓
Bidirectional recurrent neural network linguistic model
↓

Suitability for Today (s1)

Suitability for my (s2)

Suitability for mom (s3)

Suitability for sought (s4)

Suitability for me (s5)

Suitability for a (s6)

Suitability for story (s7)

FIG. 9B

| Generated sentence | Today | my | mom | sought | me | a | story | |
|---|---|---|---|---|---|---|---|---|
| Relationship with Today | | s1-1 | s1-2 | s1-3 | s1-4 | s1-5 | s1-6 | → s1 |
| Relationship with my | s2-1 | | s2-2 | s2-3 | s2-4 | s2-5 | s2-6 | → s2 |
| Relationship with mom | s3-1 | s3-2 | | s3-3 | s3-4 | s3-5 | s3-6 | → s3 |
| Relationship with taught | s4-1 | s4-2 | s4-3 | | s4-4 | s4-5 | s4-6 | → s4 |
| Relationship with me | s5-1 | s5-2 | s5-3 | s5-4 | | s5-5 | s5-6 | → s5 |
| Relationship with a | s6-1 | s6-2 | s6-3 | s6-4 | s6-5 | | s6-6 | → s6 |
| Relationship with story | s7-1 | s7-2 | s7-3 | s7-4 | s7-5 | s7-6 | | → s7 |

FIG. 13

| # | Words | Sentence score |
|---|---|---|
| 1311 Candidate sentence 1 | ○ ○ ○ ⊘ | 70 |
| 1312 Candidate sentence 2 | ⊙ ○ ○ ⊘ | 65 |
| ⋮ | ⋮ | ⋮ |
| 1313 Candidate sentence # | ○ ⊘ ○ | 50 |

↓ Correct

| # | Words | Sentence score |
|---|---|---|
| 1321 Candidate sentence 1 | ○ ⊘ ○ ○ | 75 |
| 1322 Candidate sentence 2 | ○ ⊘ ○ ○ | 70 |
| ⋮ | ⋮ | ⋮ |
| 1323 Candidate sentence # | ○ ⊘ ○ | 60 |

↓ Correct

| # | Words | Sentence score |
|---|---|---|
| 1331 Candidate sentence 1 | ○ ○ ○ ○ | 80 |
| 1332 Candidate sentence 2 | ○ ○ ○ ○ | 90 → Final result |
| ⋮ | ⋮ | ⋮ |
| 1333 Candidate sentence # | ○ ○ ○ | 70 |

METHOD AND APPARATUS FOR SPEECH RECOGNITION

CROSS-REFERENCE TO RELATED APPLICATION(S)

This application is a continuation of U.S. application Ser. No. 14/870,963, filed on Sep. 30, 2015 which claims the benefit under 35 USC 119(a) of Korean Patent Application No. 10-2014-0170818 filed on Dec. 2, 2014, in the Korean Intellectual Property Office, the entire disclosures of which are incorporated herein by reference for all purposes.

BACKGROUND

1. Field

The following description relates to an apparatus and a method for speech recognition.

2. Description of Related Art

In general, a current speech recognition method applied to a speech recognition system is not technically perfect and inevitably exhibits a recognition error due to various factors including noise. Existing speech recognition apparatuses fail to provide a correct candidate answer due to such an error, or only provide a candidate answer having a high probability of being a correct answer in a decoding operation, and thus an accuracy of such apparatuses in speech recognition is low.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition method includes receiving a sentence generated through speech recognition; calculating a degree of suitability for each word in the sentence based on a relationship of each word with other words in the sentence; detecting a target word to be corrected among words in the sentence based on the degree of suitability for each word; and replacing the target word with any one of candidate words corresponding to the target word.

The calculating of the degree of suitability may include calculating the degree of suitability for each word using a bidirectional recurrent neural network linguistic model.

The detecting of the target word may include either one or both of detecting words having a lower degree of suitability than a predetermined threshold value, and detecting a predetermined number of words, in order, starting from a lowest degree of suitability.

The replacing of the target word may include determining the candidate words based on any one or any combination of any two or more of a relationship of the candidate words with the other words in the sentence exclusive of the target word, a degree of similarity of the candidate words to a phoneme sequence of the target word, and a context of another sentence preceding the sentence.

The determining of the candidate words may include obtaining the candidate words from a pre-provided dictionary.

The replacing of the target word may include calculating a degree of suitability for each of the candidate words based on either one or both of a first model based on a degree of similarity of the candidate words to a phoneme sequence of the target word and a second model based on a relationship of the candidate words with the other words in the sentence exclusive of the target word.

The replacing of the target word may further include setting a first weighted value for the first model and a second weighted value for the second model.

The setting of the first weighted value and the second weighted value may include dynamically controlling the first weighted value and the second weighted value based on a first model based probability distribution associated with the sentence.

The generating of the sentence includes receiving speech expressed by a user; extracting features from the speech; recognizing a phoneme sequence from the features using an acoustic model; and generating the sentence by recognizing words from the phoneme sequence using a linguistic model.

The linguistic model may include a bigram language model.

In another general aspect, a non-transitory computer-readable storage medium stores instructions to cause computing hardware to perform the method described above.

In another general aspect, a speech recognition apparatus includes a first recognizer configured to generate a sentence by recognizing speech expressed by a user; and a second recognizer configured to correct at least one word in the sentence based on a context based linguistic model.

The first recognizer may include a receiver configured to receive the speech; an extractor configured to extract features from the speech; a decoder configured to decode a phoneme sequence from the features; and a generator configured to generate the sentence by recognizing words from the phoneme sequence.

The context based linguistic model may include a bidirectional recurrent neural network linguistic model.

The second recognizer may include a calculator configured to calculate a degree of suitability for each word in the sentence based on a relationship of each word with other words in the sentence; a detector configured to detect a target word to be corrected among words in the sentence based on the degree of suitability for each word; and a replacer configured to replace the target word with any one of candidate words corresponding to the target word.

The detector may be further configured to either one or both of detect words having a lower degree of suitability than a predetermined threshold value, and detect a predetermined number of words, in order, starting from a lowest degree of suitability.

The replacer may be further configured to determine the candidate words based on any one or any combination of any two or more of a position of the target word in the sentence, a relationship of the candidate words with the other words in the sentence exclusive of the target word, a degree of similarity of the candidate words to a phoneme sequence of the target word, and a context of another sentence preceding the sentence.

The replacer may be further configured to obtain the candidate words from a pre-provided dictionary.

The replacer may be further configured to calculate a degree of suitability for each of the candidate words based on either one or both of a first model based on a degree of similarity to a phoneme sequence of the target word and a second model based on a relationship with the other words in the sentence exclusive of the target word.

The replacer may be further configured to dynamically control a first weighted value for the first model and a second weighted value for the second model based on a first model based probability distribution associated with the sentence.

In another general aspect, speech recognition apparatus includes a first recognizer configured to recognize a sentence from speech expressed by a user using a first linguistic model; and a second recognizer configured to improve an accuracy of the sentence using a second linguistic model having a higher complexity than the first linguistic model.

The first recognizer may be further configured to recognize phonemes from the speech using an acoustic model, and recognize the sentence from the phonemes using the first linguistic model.

The second recognizer may be further configured to identify a word in the sentence most likely to be incorrect among all words of the sentence using the second linguistic model, and replace the identified word with a word that improves the accuracy of the sentence using the second linguistic model.

The second recognizer may be further configured to replace the identified word with a word that improves the accuracy of the sentence using the second linguistic model and an acoustic model.

The first recognizer may be further configured to recognize phonemes from the speech using the acoustic model, and recognize the sentence from the phonemes using the first linguistic model.

The second recognizer may be further configured to obtain candidate words based on the identified word, and select the word that improves the accuracy of the sentence from the candidate words.

The second recognizer may be further configured to obtain the candidate words from a pre-provided dictionary based on the identified word and other words in the sentence using either one or both of the second linguistic model and an acoustic model.

Other features and aspects will be apparent from the following detailed description, the drawings, and the claims.

BRIEF DESCRIPTION OF THE DRAWINGS

FIGS. 9A through 13 are diagrams illustrating examples of an operation of a second recognizer.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or methods described herein will be apparent to one of ordinary skill in the art. The sequences of operations described herein are merely examples, and are not limited to those set forth herein, but may be changed as will be apparently to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Examples described hereinafter are applicable to a speech recognition method and may used for various devices and apparatuses such as mobile terminals, smart appliances, medical apparatuses, vehicle control devices, and other computing devices to which such a speech recognition method is applied.

Figure 1:
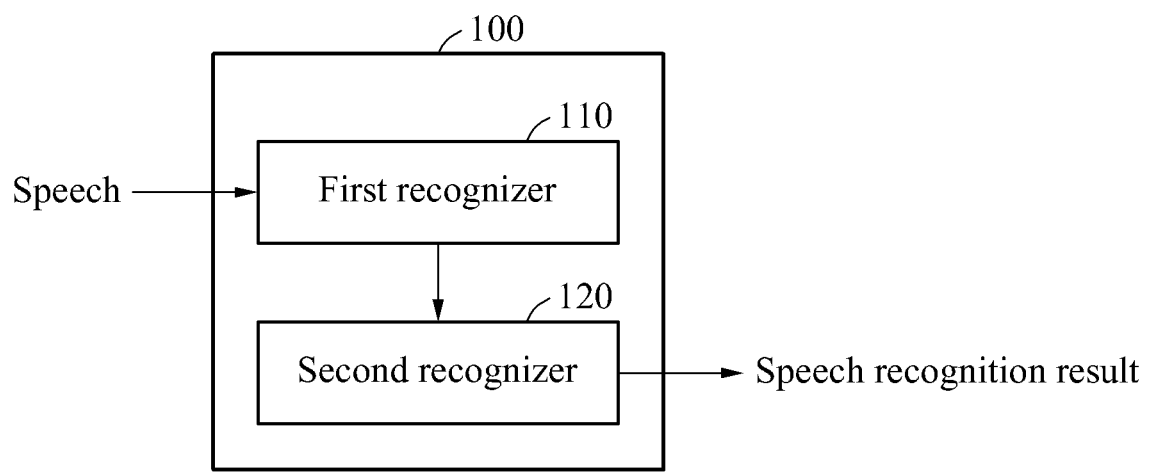
FIG. 1 is a diagram illustrating an example of a speech recognition apparatus.

FIG. 1 is a diagram illustrating an example of a speech recognition apparatus 100. Referring to FIG. 1, the speech recognition apparatus 100 includes a first recognizer 110 and a second recognizer 120. The first recognizer 110 generates a temporary recognition result by recognizing speech expressed by a user. The first recognizer 110 generates a sentence corresponding to the temporary recognition result.

The first recognizer 110 recognizes the speech based on a first linguistic model to generate the sentence corresponding to the temporary recognition result. The first linguistic model is a simpler model compared to a second linguistic model used by the second recognizer 120, and may include, for example, an n-gram language model. Thus, the second linguistic model is a more complex model compared to the first linguistic model, or in other words, has a higher complexity than the first linguistic model.

The first recognizer 110 may receive the speech through various means. For example, the first recognizer 110 may receive speech to be input through a microphone, receive speech stored in a pre-equipped storage, or receive remote speech through a network. A detailed operation of the first recognizer 110 will be described later.

The second recognizer 120 generates a final recognition result based on the temporary recognition result. As used herein, the final recognition result is a speech recognition result. The second recognizer 120 corrects at least one word in the sentence corresponding to the temporary recognition result based on the second linguistic model and outputs the speech recognition result. The speech recognition result is a sentence in which the at least one word is corrected. Thus, the second recognizer 120 improves an accuracy of the sentence corresponding to the temporary recognition result recognized by the first recognizer 110.

The second linguistic model is a linguistic model based on a context of a sentence and includes, for example, a bidirectional recurrent neural network linguistic model. Prior to describing an operation of the second recognizer 120 in detail, the bidirectional recurrent neural network linguistic model will be briefly described with reference to FIGS. 2 through 6.

Figure 2:
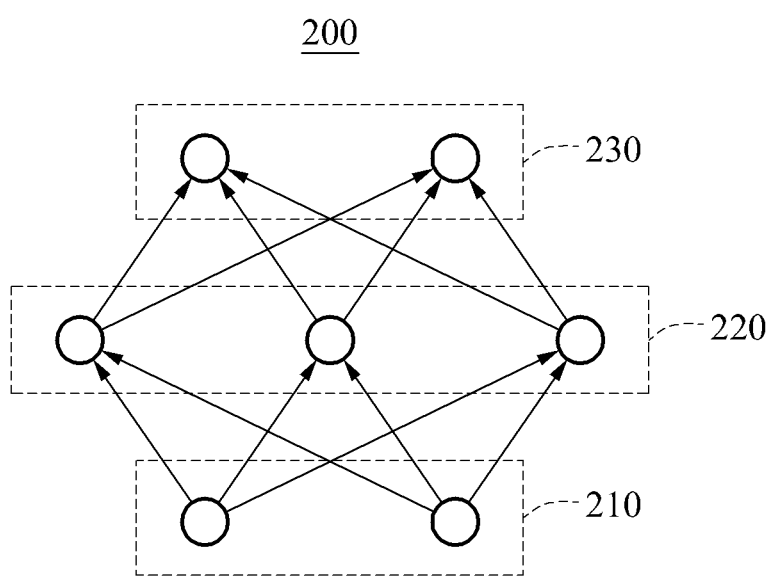
FIGS. 2 through 6 are diagrams illustrating examples of a bidirectional recurrent neural network linguistic model.

FIGS. 2 through 6 are diagrams illustrating examples of a bidirectional recurrent neural network linguistic model. Referring to FIG. 2, a neural network 200 is a recognition model that emulates computability of a biological system using numerous artificial neurons connected through connection lines. The neural network 200 uses such artificial neurons having simplified functions of biological neurons. An artificial neuron may also be referred to as a node. The artificial neurons may be interconnected through connection lines having respective connection weights. The neural network 200 performs human cognition or a learning process through the artificial neurons.

The neural network 200 includes layers. For example, the neural network 200 includes an input layer 210, a hidden layer 220, and an output layer 230. The input layer 210 receives an input for performing learning and transmits the input to the hidden layer 220, and the output layer 230 generates an output of the neural network 200 based on signals received from the hidden layer 220. The hidden layer 220 is positioned between the input layer 210 and the output layer 230, and changes learning data transmitted through the input layer 210 to be a predictable value.

Input nodes included in the input layer 210 and hidden nodes included in the hidden layer 220 are interconnected through connection lines having respective connection weights. The hidden nodes included in the hidden layer 220 and output nodes included in the output layer 230 are interconnected through connection lines having respective connection weights.

In the learning process of the neural network 200, the connection weights among the artificial neurons are updated through error back-propagation learning. Error back-propagation learning is a method of estimating an error through forward computation on given learning data, and updating the connection weights to reduce the error while propagating the estimated error in a backward direction starting from the output layer 230 to the hidden layer 220 and the input layer 210.

Figure 3:
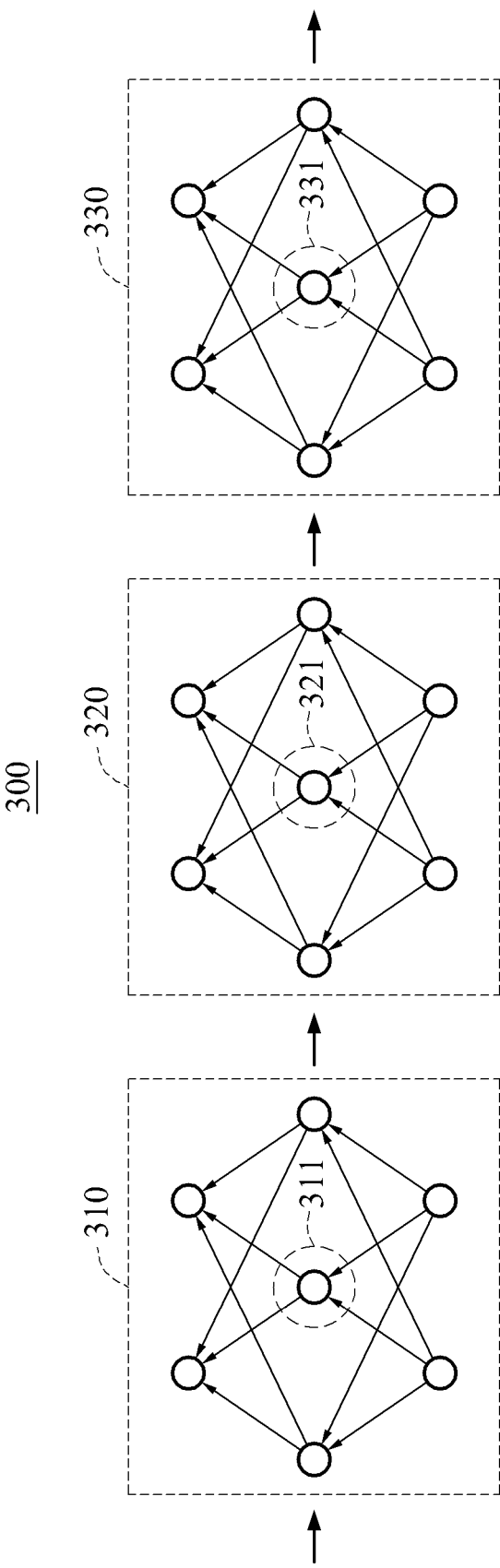

Referring to FIG. 3, a recurrent neural network 300 is a neural network having recurrent connections among hidden nodes in different time sections. In contrast to a general neural network, the recurrent neural network 300 uses an internal memory that processes an input sequence. An output of a hidden node in a preceding time section 310 is connected to hidden nodes in a current time section 320. Similarly, an output of a hidden node in the current time section 320 is connected to hidden nodes in a subsequent time section 330.

Figure 4:
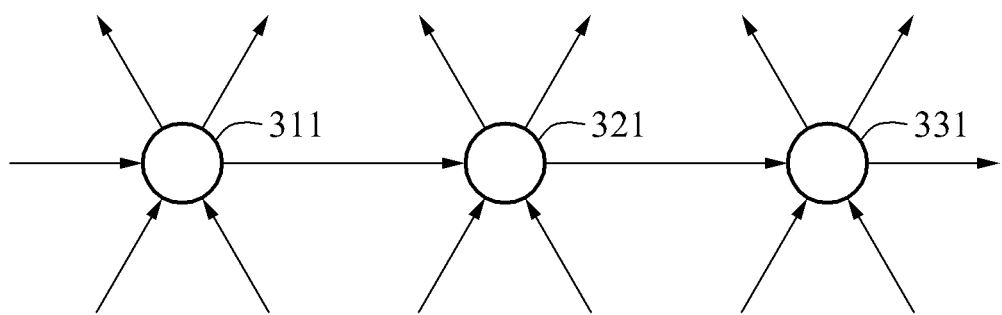

For example, a first hidden node 311 in the preceding time section 310, a second hidden node 321 in the current time section 320, and a third hidden node 331 in the subsequent time section 330 are connected as illustrated in FIG. 4. Referring to FIG. 4, an output of the first hidden node 311 is input to the second hidden node 321, and an output of the second hidden node 321 is input to the third hidden node 331.

Figure 5:
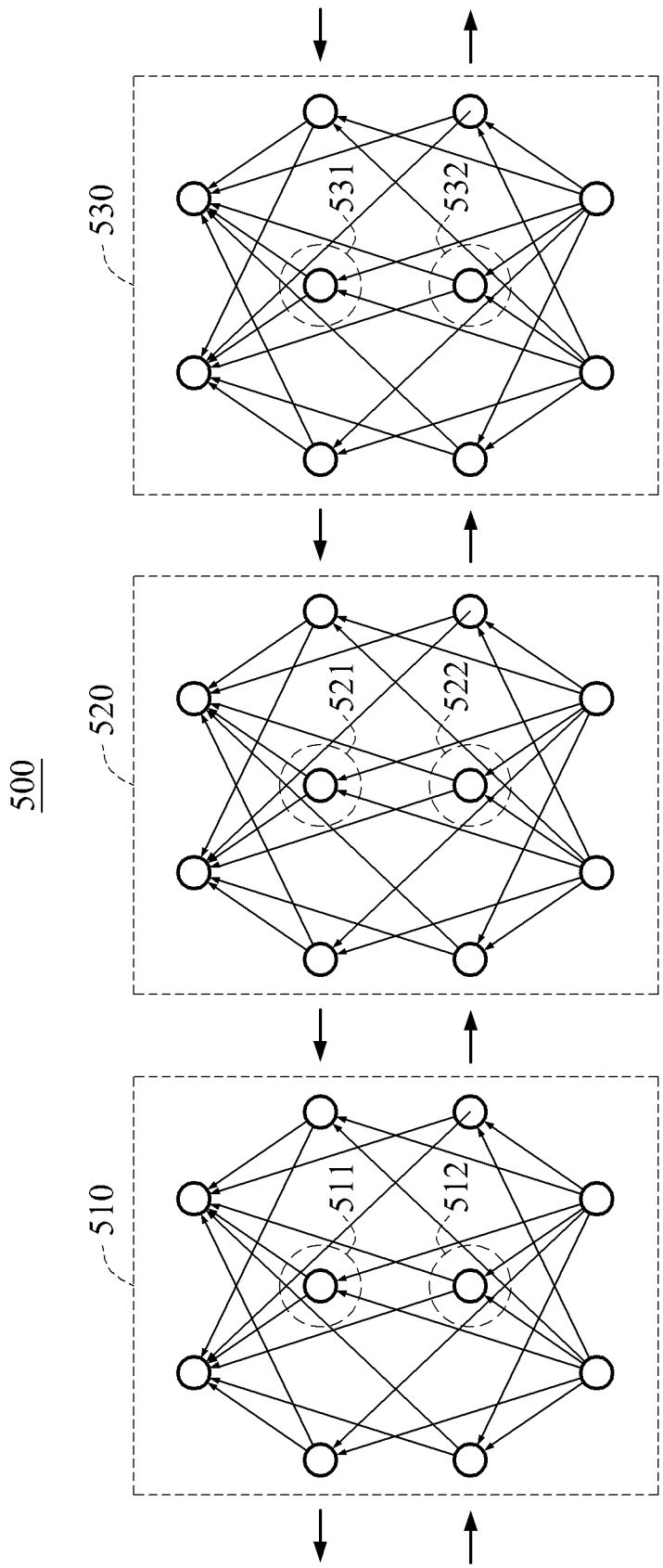

Referring to FIG. 5, a bidirectional recurrent neural network 500 is a neural network having bidirectionally recurrent connections among hidden nodes in different time sections. Similar to the recurrent neural network 300, the bidirectional recurrent neural network 500 also uses an internal memory that processes an input sequence. An output of a hidden node in a preceding time section 510 is connected to hidden nodes in a current time section 520, and an output of a hidden node in the current time section 520 is connected to hidden nodes in a subsequent time section 530. In addition, an output of a hidden node in the subsequent time section 530 is connected to the hidden nodes in the current time section 530, and an output of a hidden node in the current time section 520 is connected to hidden nodes in the preceding time section 510.

Figure 6:
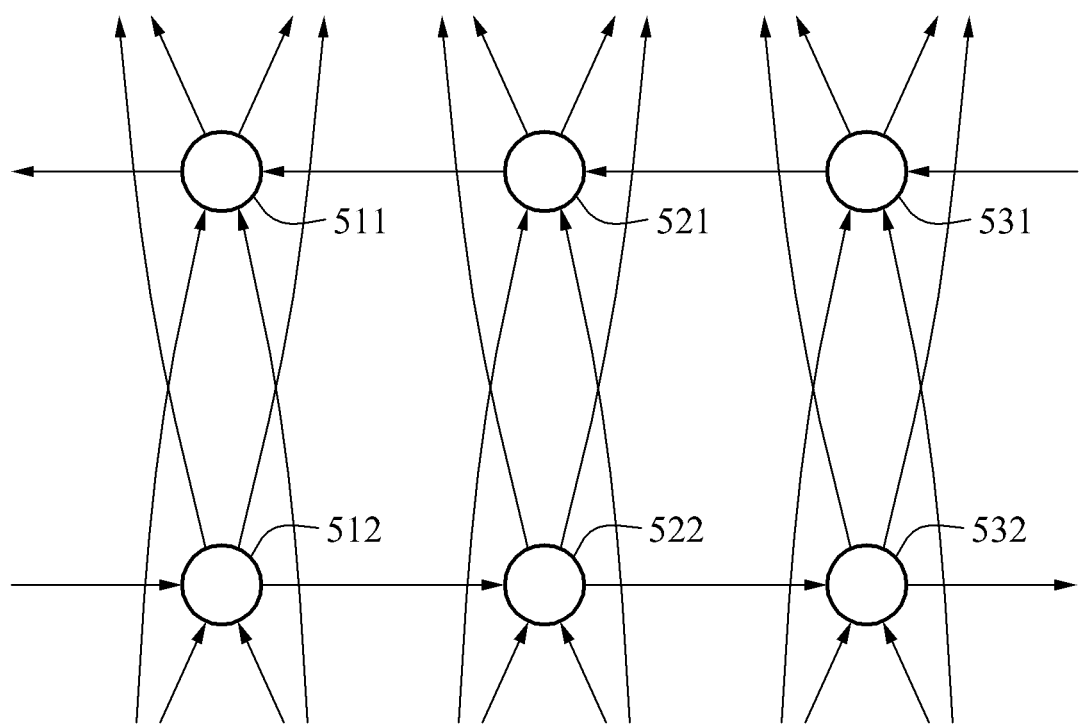

For example, a 1-1 hidden node 511 and a 1-2 hidden node 512 in the preceding time section 510, a 2-1 hidden node 521 and a 2-2 hidden node 522 in the current time section 520, and a 3-1 hidden node 531 and a 3-2 hidden node 532 in the subsequent time section 530 are connected as illustrated in FIG. 6. Referring to FIG. 6, an output of the 3-1 hidden node 531 is input to the 2-1 hidden node 521, and an output of the 2-1 hidden node 521 is input to the 1-1 hidden node 511. In addition, an output of the 1-2 hidden node 512 is input to the 2-2 hidden node 522, and an output of the 2-2 hidden node 522 is input to the 3-2 hidden node 532.

A bidirectional recurrent neural network linguistic model is a model trained on a context, grammar, and other characteristics of a language using such a bidirectional recurrent neural network. Referring back to FIG. 1, the second recognizer 120 corrects a word in the sentence corresponding to the temporary recognition result based on a context of the sentence using such a bidirectional recurrent neural network linguistic model. For example, when a word in the sentence corresponding to the temporary recognition result corresponds to a current time section in the bidirectional recurrent neural network, a word positioned prior to the word corresponds to a preceding time section in the bidirectional recurrent neural network. Similarly, a word positioned subsequent to the word corresponds to a subsequent time section in the bidirectional recurrent neural network.

Although a case in which the second recognizer 120 uses the bidirectional recurrent neural network linguistic model will be described herein for ease of description, the operation of the second recognizer 120 is limited to such a case. For example, the second recognizer 120 may use any linguistic model based on a context of a sentence instead of, or in addition to, the bidirectional recurrent neural network.

Figure 7:
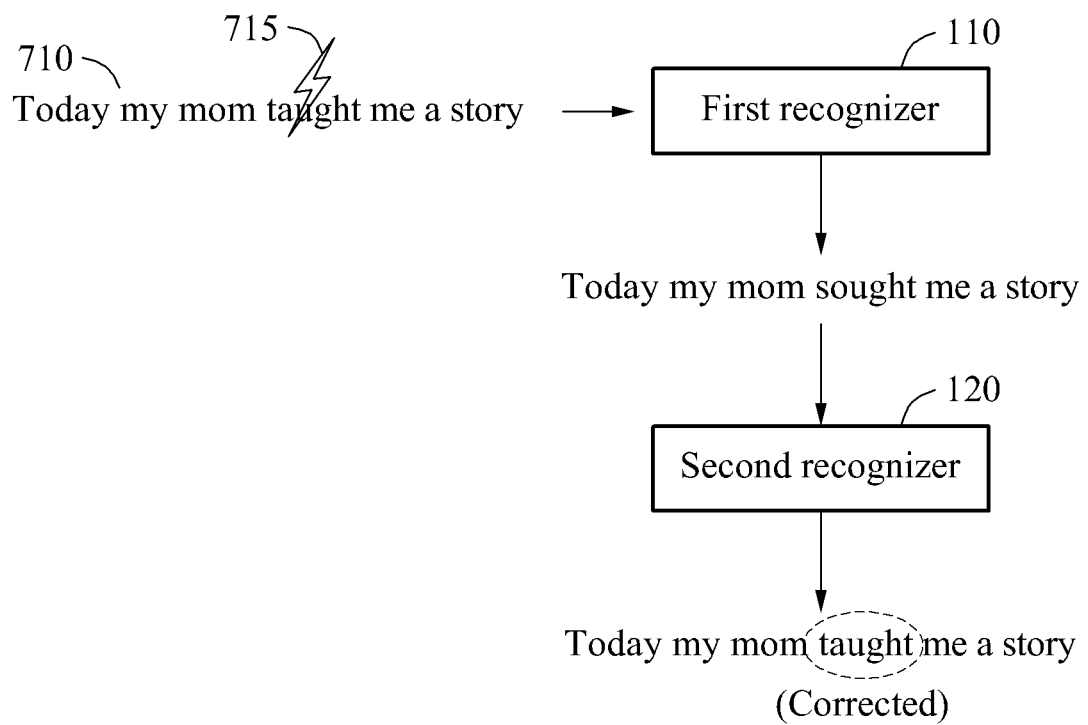
FIG. 7 is a diagram illustrating an example of an operation of a speech recognition apparatus.

FIG. 7 is a diagram illustrating an example of an operation of a speech recognition apparatus. Referring to FIG. 7, the first recognizer 110 of FIG. 1 generates a temporary recognition result by first recognizing speech 710 expressed by a user, and the second recognizer 120 of FIG. 1 generates a final recognition result, which is a speech recognition result, by verifying the temporary recognition result.

In the example in FIG. 7, the first recognizer 110 receives the speech 710, for example, "Today my mom taught me a story." The first recognizer 110 does not correctly recognize the speech 710 due to noise 715. For example, in a case of the noise 715 occurring while "taught" of the speech 710 is being received, the first recognizer 110 incorrectly recognizes "taught" as "sought." In such an example, the temporary recognition result generated by the first recognizer 110 is "Today my mom sought me a story."

The second recognizer 120 determines "sought" to be contextually unsuitable using a bidirectional recurrent neural network linguistic model. Since "sought" is determined to be unsuitable, the second recognizer 120 corrects "sought" to "taught." The second recognizer 120 then outputs a corrected sentence. In such an example, the final recognition result is "Today my mom taught me a story." A detailed operation of the second recognizer 120 will be described with reference to FIGS. 8 through 13.

Figure 8:
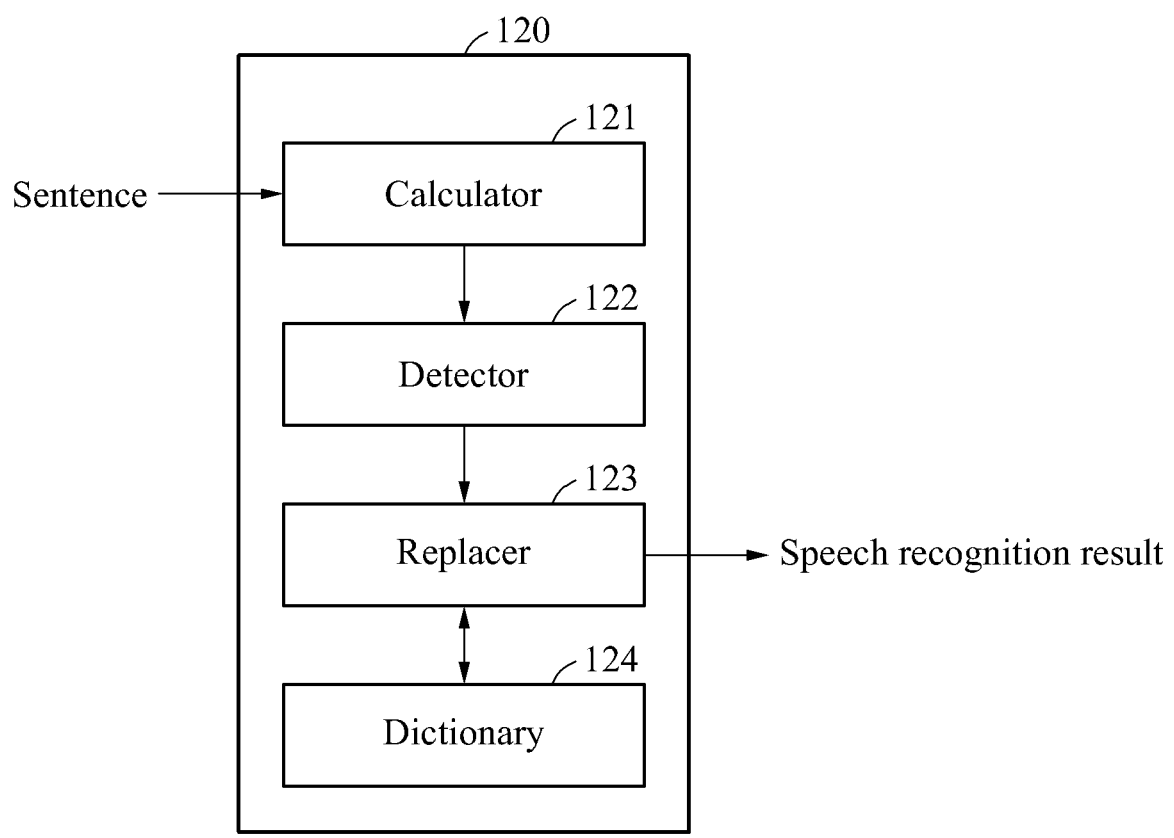
FIG. 8 is a diagram illustrating an example of a second recognizer.

FIG. 8 is a diagram illustrating an example of the second recognizer 120. Referring to FIG. 8, the second recognizer 120 includes a calculator 121, a detector 122, and a replacer 123.

The calculator 121 calculates a degree of suitability for each word included in a sentence generated by the first recognizer 110 based on a relationship with other words in the sentence. The detector 122 detects a target word to be corrected among words in the sentence based on the calculated degrees of suitability for the words. The replacer 123 replaces the target word with any one of candidate words corresponding to the detected target word.

In one example, referring to FIG. 9A, the calculator 121 calculates a degree of suitability for each word included in a sentence corresponding to a temporary recognition result using a bidirectional recurrent neural network linguistic model. The bidirectional recurrent neural network linguistic model receives the sentence corresponding to the temporary recognition result and outputs respective degrees of suitability for words included in the sentence.

For example, the bidirectional recurrent neural network linguistic model outputs a degree of suitability (s1) for "Today" based on a context of the sentence. The s1 for "Today" may be a conditional probability. For example, the s1 for "Today" may be indicated as a probability that "Today" is placed at a corresponding position in the sentence under a condition in which other words are given in the sentence. The bidirectional recurrent neural network linguistic model outputs respective degrees of suitability for the other words in the sentence, for example, a degree of suitability (s2) for "my," a degree of suitability (s3) for "mom," a degree of suitability (s4) for "sought," a degree of suitability (s5) for "me," a degree of suitability (s6) for "a," and a degree of suitability (s7) for "story."

The detector 122 detects a target word to be corrected based on the calculated degrees of suitability, for example, s1 through s7. For example, the detector 122 detects words having a lower degree of suitability than a predetermined threshold value, or detects a predetermined number of words, in order, starting from a lowest degree of suitability. For ease of description, a case in which a word having a lowest degree of suitability is detected will be described hereinafter.

FIGS. 9A through 13 are diagrams illustrating examples of an operation of the second recognizer 120.

In the example of FIG. 9A, among the degrees of suitability s1 through s7, the s4 for "sought" is lowest. For example, the s4 for "sought" is calculated to be lowest because "sought" does not fit with the other words and is unsuitable for a context of the sentence and a grammatical and syntactical structure of the sentence, for example, a fifth sentence structure. In such an example, the detector 122 detects "sought" as the target word to be corrected.

In another example, referring to FIG. 9B, the calculator 121 calculates a degree of suitability (s1) for "Today" based on a relationship between "Today" and each of other words in a sentence. In the example in FIG. 9B, the relationship between "Today" and the other words is indicated as a score using the bidirectional recurrent neural network linguistic model. For example, the calculator 121 calculates a score (s1-1) corresponding to a relationship between "Today" and "my," a score (s1-2) corresponding to a relationship between "Today" and "mom," a score (s1-3) corresponding to a relationship between "Today" and "sought," a score (s1-4) corresponding to a relationship between "Today" and "me," a score (s1-5) corresponding to a relationship between "Today" and "a," and a score (s1-6) corresponding to a relationship between "Today" and "story."

The calculator 121 calculates s1 for "Today" based on the scores s1-1 through s1-6. For example, the calculator 121 calculates the s1 for "Today" using various statistics such as a sum, a mean, a dispersion, and a standard deviation of the scores s1-1 through s1-6. The calculator 121 calculates s2 for "my," s3 for "mom," s4 for "sought," s5 for "me," s6 for "a," and s7 for "story" using the method used to calculate s1 for "Today."

Figure 10:
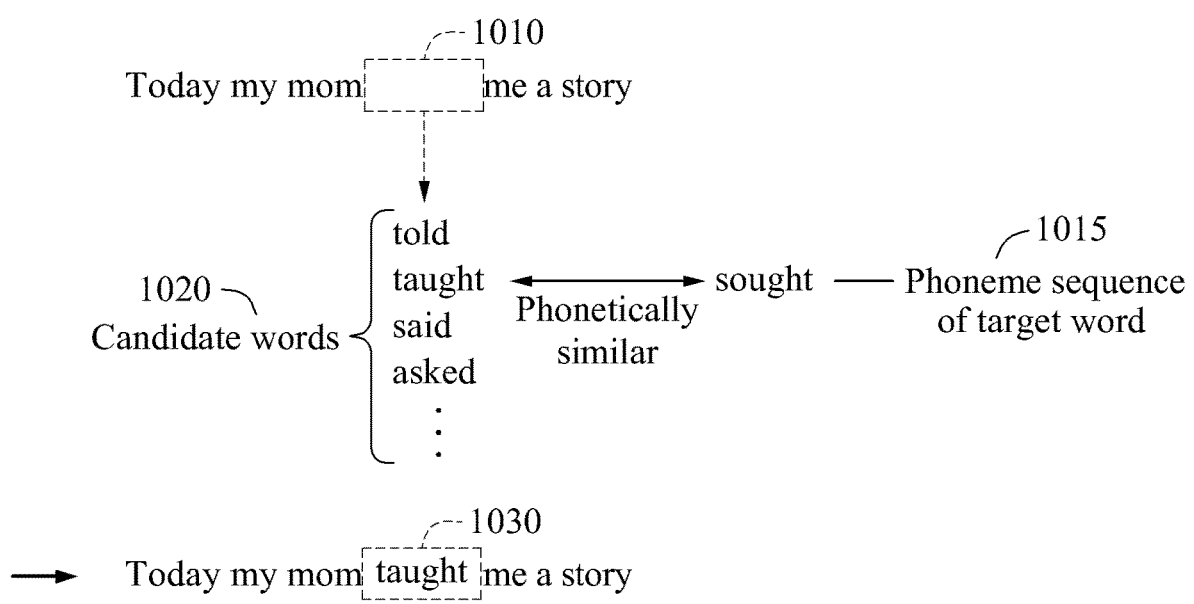

Referring to FIG. 10, the replacer 123 determines candidate words for a target word to be corrected, and selects an optimal candidate word from the determined candidate words. The replacer 123 determines the candidate words using various methods. For example, the replacer 123 determines the candidate words based on a position of the target word in a sentence corresponding to a temporary recognition result, a relationship of the candidate words with the other words in the sentence exclusive of the target word, a degree of similarity of the candidate words to a phoneme sequence of the target word, and a context of a sentence preceding the sentence corresponding to the temporary recognition result.

The replacer 123 obtains the candidate words from a pre-provided dictionary 124. The replacer 123 obtains the candidate words from the pre-provided dictionary 124 based on the position of the target word in the sentence corresponding to the temporary recognition result, the relationship of the candidate words with the other words in the sentence exclusive of the target word, the degree of similarity of the candidate words to the phoneme sequence of the target word, and the context of the sentence preceding the sentence corresponding to the temporary recognition result.

For example, as illustrated in FIG. 10, the replacer 123 obtains, from the dictionary 124, candidate words 1020 that may be contextually placed in a position of a target word 1010 based on a relationship of the candidate words with other words exclusive of the target word 1010. Alternatively, the replacer 123 may obtain, from the dictionary 124, candidate words 1020 that may be grammatically placed in the position of the target word 1010 in a sentence corresponding to a temporary recognition result. Alternatively, the replacer 123 may obtain, from the dictionary 124, candidate words 1020 having a predetermined or higher degree of similarity to a phoneme sequence 1015 of the target word 1010, or exclude, from a set of candidate words 1020, a word having a phoneme sequence with a predetermined degree of difference from the phoneme sequence 1015 of the target word 1010. Alternatively, the replacer 123 may obtain, from the dictionary 124, candidate words 1020 suitable for placing in the position of the target word 1010 based on a context of a sentence preceding the sentence corresponding to the temporary recognition result.

Subsequent to the determining of the candidate words 1020, the replacer 123 selects an optimal candidate word 1030 from the candidate words 1020. The replacer 123 may select the optimal candidate word 1030 using various methods. For example, the replacer 123 selects, as the optimal candidate word 1030, a word having a phoneme sequence most similar to the phoneme sequence 1015 of the target word 1010. The replacer 123 replaces the target word 1010 with the optimal candidate word 1030.

For example, the candidate words 1020 include "told," "taught," "said," and "asked" as illustrated in FIG. 10. The replacer 123 selects, as the optimal candidate word 1030, "taught" having a phoneme sequence most similar to a phoneme sequence of "sought," which is the phoneme sequence 1015 of the target word 1010, from the candidate words 1020. The replacer 123 corrects "sought" to be "taught" in the sentence corresponding to the temporary recognition result, and outputs a corrected sentence in which "sought" is corrected as "taught."

The replacer 123 selects the optimal candidate word 1030 from the candidate words 1020 based on both linguistic model based information and acoustic model based information.

Figure 11:
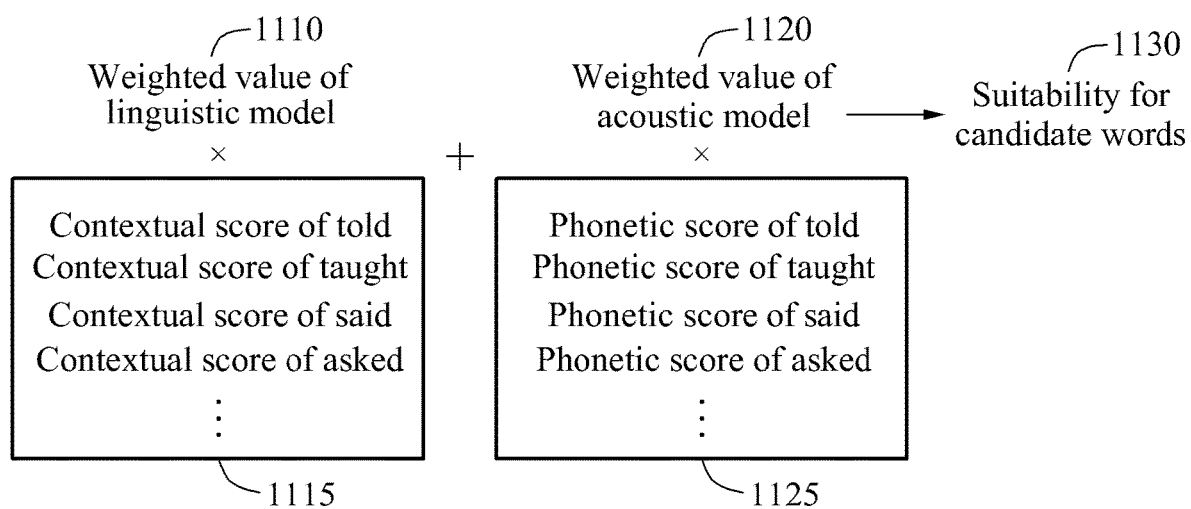

Referring to FIG. 11, a degree of suitability 1130 for each candidate word is calculated based on linguistic model based information 1115 and acoustic model based information 1125.

The linguistic model based information 1115 includes respective contextual scores of candidate words calculated based on a linguistic model, which may be a bidirectional recurrent neural network linguistic model. A contextual score of a candidate word may be a conditional probability. For example, respective conditional probabilities of the candidate words may be calculated based on the linguistic model in a condition in which other words are given in a sentence.

The acoustic model based information 1125 includes respective phonetic scores of the candidate words calculated based on an acoustic model. A phonetic score of a candidate word is a degree of similarity in a phoneme sequence. For example, a degree of similarity between a phoneme sequence of a target word and a phoneme sequence of each candidate word may be calculated based on the linguistic model.

The replacer 123 adjusts a ratio at which the linguistic model based information 1115 and the acoustic model based information 1125 are reflected in the degree of suitability 1130 for each candidate word using a weighted value 1110 of the linguistic model and a weighted value 1120 of the acoustic model. In one example, the replacer 123 dynamically controls the weighted value 1110 of the linguistic model and the weighted value 1120 of the acoustic model. For example, in response to a high reliability of the acoustic model, the replacer 123 increases the weighted value 1120 of the acoustic model or decreases the weighted value 1110 of the linguistic model. Alternatively, in response to a high reliability of the linguistic model, the replacer 123 increases the weighted value of the linguistic model or decreases the weighted value 1120 of the acoustic model.

Figure 12:
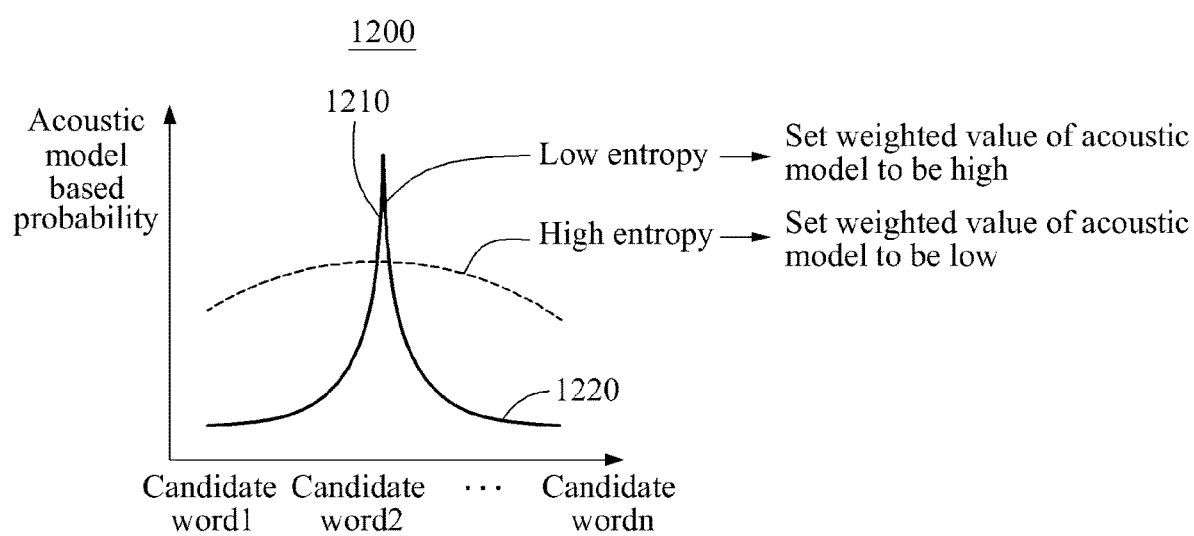

FIG. 12 illustrates an example of a dynamic control of a weighted value of a linguistic model and a weighted value of an acoustic model based on a reliability of the acoustic model. Referring to FIG. 12, the replacer 123 determines the reliability of the acoustic model based on a probability distribution of each word included in a temporary recognition result. When the temporary recognition result is generated, each word included in a speech recognition result is selected from candidate words. For example, when the acoustic model based probability distribution is concentrated on a candidate word, for example, a candidate word 2, as indicated by a solid line 1210 in a graph 1200, entropy is low. The low entropy is construed as a high recognition reliability in selecting a candidate word from the candidate words, and thus as a high reliability of the acoustic model. In such an example, the replacer 123 sets the weighted value of the acoustic model to be relatively higher than the weighted value of the linguistic model. Alternatively, the replacer 123 sets the weighted value of the linguistic model to be relatively lower than the weighed value of the acoustic model.

As another example, when the acoustic model based probability distribution is relatively even for candidate words as indicated by a broken line 1220 in the graph 1200, entropy is high. The high entropy is construed as a low recognition reliability in selecting a candidate word from the candidate words, and thus as a low reliability of the acoustic model. In such an example, the replacer 123 sets the weighted value of the acoustic model to be relatively lower than the weighted value of the linguistic model. Alternatively, the replacer 123 sets the weighted value of the linguistic model to be relatively higher than the weighted value of the acoustic model.

The replacer 123 selects an optimal candidate word from candidate words based on a degree of suitability for each candidate word. For example, the replacer 123 selects, as the optimal candidate word, a candidate word having a highest degree of suitability.

The operating method of the speech recognizing apparatus 100 of FIG. 1 may be implemented in various ways. Referring to FIG. 13, the first recognizer 110 generates candidate sentences. The first recognizer 110 generates the candidate sentences based on a received speech.

The candidate sentences include words having different phonemic lengths or different numbers of words. For example, a phonemic length of a first word in a first candidate sentence 1311 is shorter than a phonemic length of a first word in a second candidate sentence 1312. Alternatively, the first candidate sentence 1311 and the second candidate sentence 1312 include four words, and a third candidate sentence 1313 includes three words.

Each candidate sentence evaluated to obtain a sentence score. For example, a sentence score of the first candidate sentence 1311, the second candidate sentence 1312, and the third candidate sentence 1313 is 70, 65, and 50, respectively.

The second recognizer 120 detects at least one target word to be corrected from each candidate sentence. The second recognizer 120 corrects the target word for each candidate sentence to be an optimal candidate word using the method described above. Here, at least two target words are selected from a single candidate sentence, and the second recognizer 120 corrects the target words sequentially or simultaneously.

The corrected candidate sentences, for example, a corrected first candidate sentence 1321, a corrected second candidate sentence 1322, and a corrected third candidate sentence 1323, are evaluated to obtain a sentence score. For example, a sentence score of the corrected first candidate sentence 1321, the corrected second candidate sentence 1322, and the corrected third candidate sentence 1323 is 75, 70, and 60, respectively.

The second recognizer 120 repeats the correcting until a candidate sentence having a predetermined or higher sentence score is generated. The second recognizer 120 detects target words from the corrected candidate sentences and corrects the detected target words to be optimal candidate words.

An order of the sentence scores of the candidate sentences may be reversed due to the repeated correcting. For example, a sentence score of a re-corrected first candidate sentence 1331, a re-corrected second candidate sentence 1332, and a re-corrected third candidate sentence 1333 is 80, 90, and 70, respectively. The second recognizer 120 then outputs, as a final result, the re-corrected second candidate sentence 1332.

The second recognizer 120 not only detects an optimal candidate sentence by rescoring candidate sentences, but also corrects target words in the candidate sentences using a bidirectional recurrent neural network linguistic model. The second recognizer 120 improves an accuracy of speech recognition despite an absence of a correct answer from the candidate sentences due to noise and other factors. The operation of the second recognizer 120 searching for a word using the bidirectional recurrent neural network linguistic model is similar to a speech recognition mechanism performed by a human being.

Figure 14:
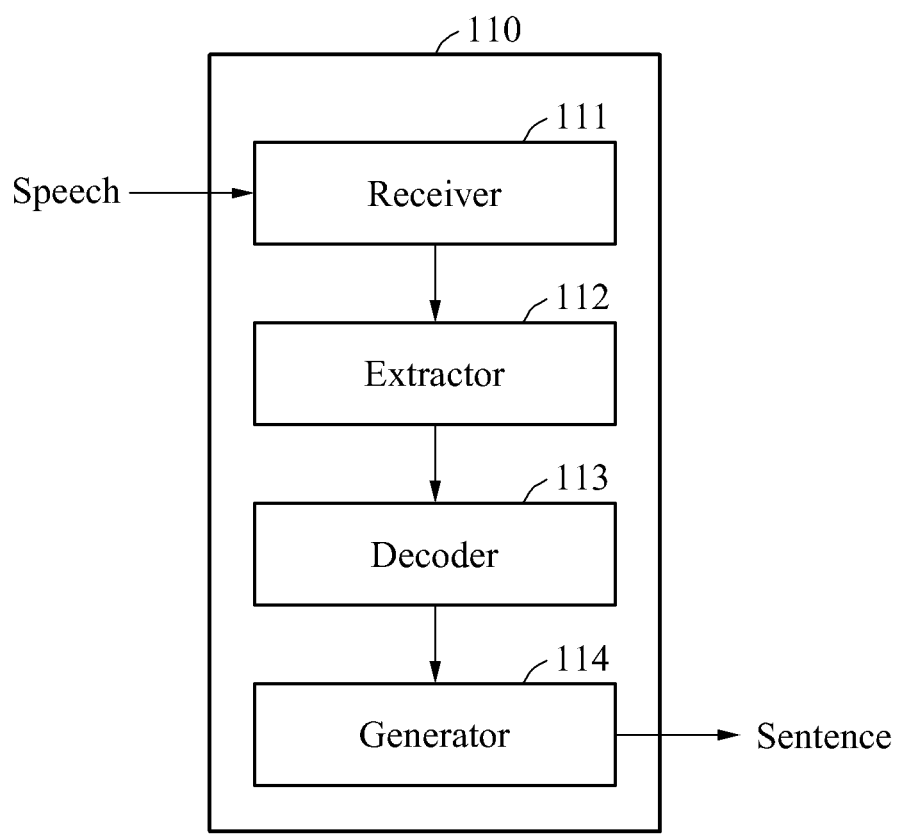
FIG. 14 is a diagram illustrating an example of a first recognizer.

FIG. 14 is a diagram illustrating an example of the first recognizer 110. Referring to FIG. 14, the first recognizer 110 includes a receiver 111, an extractor 112, a decoder 113, and a generator 114.

The receiver 111 receives speech expressed by a user, and the extractor 112 extracts features from the received speech. The extractor 112 extracts the features using various methods. For example, the extractor 112 may extract the features from the speech using a linear predictive coding (LPC) method, a mel frequency cepstral coefficients (MFCC) method, or any other method of extracting features from speech known to one of ordinary skill in the art.

The decoder 113 decodes a phoneme sequence from the extracted features. For example, the decoder 113 decodes the phoneme sequence from the extracted features using an acoustic model. The acoustic model may use a dynamic time warping (DTW) method that matches patterns based on a template and a hidden Markov modeling (HMM) method that statistically recognizes a pattern.

The generator 114 generates a sentence corresponding to a temporary recognition result by recognizing words from phoneme sequences. For example, the generator 114 recognizes the words from the phoneme sequences using a first linguistic model. The first linguistic model is a simpler linguistic model, for example, a bigram linguistic model, than a second linguistic model used by the second recognizer 120.

Although not illustrated in FIG. 14, the first recognizer 110 may further include a preprocessor that extracts a recognition section from the received speech and performs a preprocessing operation, for example, an operation of processing noise in the recognition section.

Figure 15:
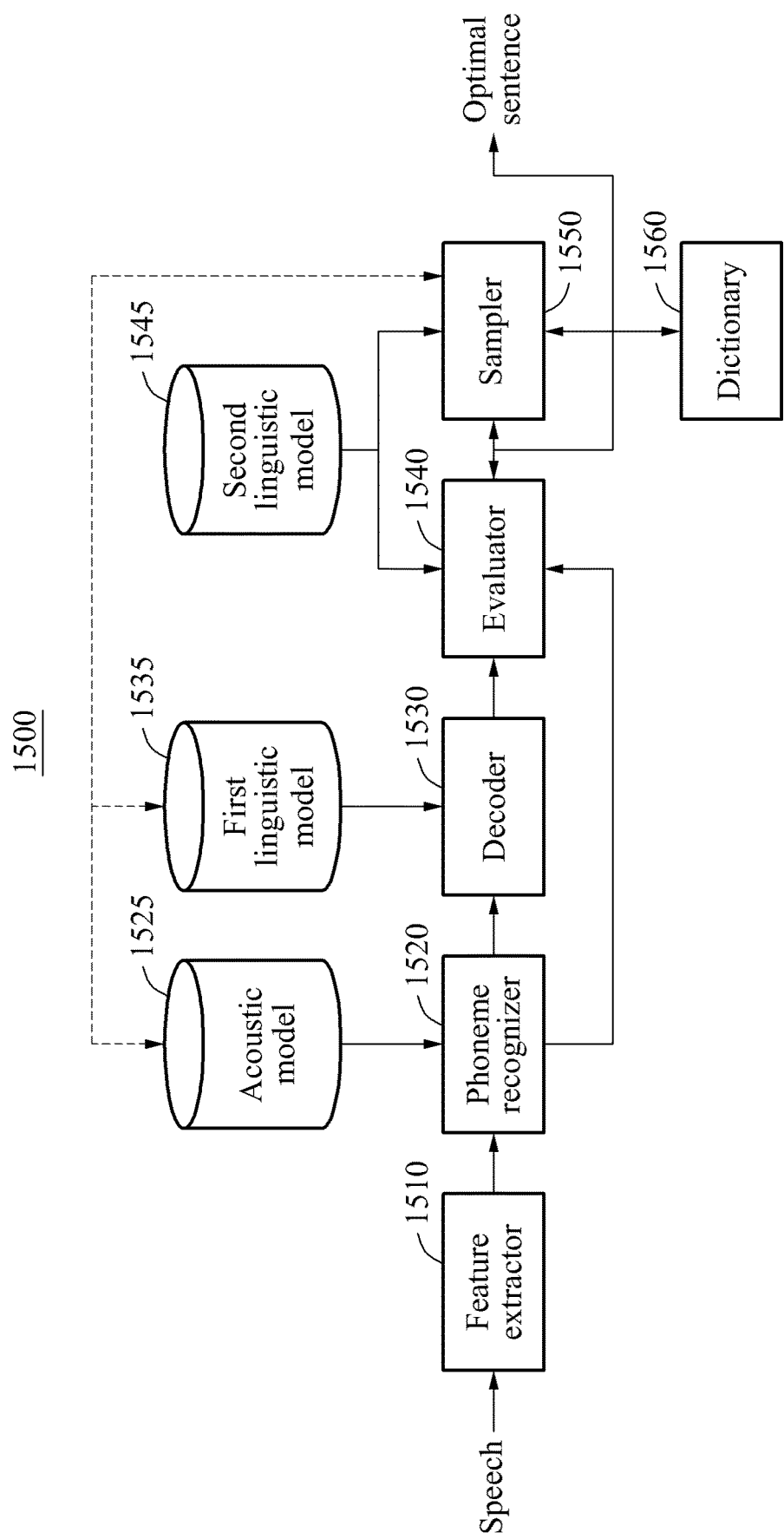
FIG. 15 is a diagram illustrating another example of a speech recognition apparatus.

FIG. 15 is a diagram illustrating another example of a speech recognition apparatus 1500. Referring to FIG. 15, the speech recognition apparatus 1500 includes a feature extractor 1510, a phoneme recognizer 1520, a decoder 1530, an evaluator 1540, and a sampler 1550.

The feature extractor 1510 extracts features from speech. The feature extractor 1510 extracts the features from the speech using an LPC method, an MFCC method, or any other feature extraction method known to one of ordinary skill in the art. The phoneme recognizer 1520 recognizes phonemes from the features using an acoustic model 1525. For example, the acoustic model 1525 may be a DTW based acoustic model, a HMM based acoustic model, or any other acoustic model known to one of ordinary skill in the art. The decoder 1530 generates a sentence corresponding to a temporary recognition result by recognizing words from the phonemes using a first linguistic model 1535. For example, the first linguistic model 1535 is an n-gram language model.

The evaluator 1540 evaluates a degree of suitability for each word in the sentence corresponding to the temporary recognition result. The evaluator 1540 evaluates the degree of suitability for each word based on a context with respect to each word in the sentence using a second linguistic model 1545. In one example, the second linguistic model 1545 is a bidirectional recurrent neural network linguistic model. The evaluator 1540 determines a presence of a target word to be corrected in the sentence based on a result of the evaluating. For example, the evaluator 1540 calculates respective conditional probabilities of all words in the sentence, and detects the target word based on the conditional probabilities.

The sampler 1550 recommends, or samples, candidate words for the target word. For example, the sampler 1550 recommends words suitable for a position of the target word based on the second linguistic model 1545. For example, the second linguistic model 1545 is the bidirectional recurrent neural network linguistic model. The sampler 1550 provides probabilities of the candidate words recommended for the position of the target word based on the sentence using the bidirectional recurrent neural network linguistic model. For example, the sampler 1550 calculates the probabilities of the candidate words suitable for the position of the target word based on a first portion of the sentence ranging from a front portion of the sentence to the position of the target word and a second portion of the sentence ranging from a rear portion of the sentence to the position of the target word. In one example, the sampler 1550 selects, from a dictionary 1560, a predetermined number of candidate words, in order, starting from a highest probability.

As necessary, the sampler 1550 compares distances between acoustic model based phoneme sequences of the candidate words and an acoustic model based phoneme sequence of the target word. In one example, the sampler 1550 excludes, from a set of the candidate words, a candidate word having a predetermined or longer distance between an acoustic model based phoneme sequence of the candidate word and the acoustic model based phoneme sequence of the target word. In one example, the phoneme sequences of the candidate words are stored in the dictionary 1560.

The sampler 1550 recommends the candidate words using contextual information. For example, the sampler 1550 detects a topic of a preceding sentence, and recommends candidate words in a subsequent sentence based on the detected topic. In one example, the sampler 1550 compares the topic detected from the preceding sentence to topics associated with words prestored in the dictionary 1560, and recommend words having a topic similar to the detected topic as the candidate words.

The evaluator 1540 evaluates a degree of suitability for sampled words. The evaluator 1540 selects an optimal candidate word by comparing the target word to the candidate words recommended based on the second linguistic model 1545. In one example, when comparing the target word to the candidate words, the evaluator 1540 dynamically controls a weighted value of the second linguistic model 1545 and a weighted value of the acoustic model 1525. For example, when a probability distribution calculated based on the acoustic model 1525 is concentrated on a candidate word and entropy is low, the evaluator 1540 assigns a high weighted value to the acoustic model 1525. Conversely, when the probability distribution calculated based on the acoustic model 1525 is relatively even for candidate words and entropy is high, the evaluator 1540 assigns a low weighed value to the acoustic model 1525.

The acoustic model 1525, the first linguistic model 1535, and the second linguistic model 1545 may be stored in a storage pre-equipped in the speech recognition apparatus 1500 or in a remotely located server. When the acoustic model 1525, the first linguistic model 1535, are the second linguistic model 1545 are stored in the server, the speech recognition apparatus 1500 uses the models stored in the server through a network.

The speech recognition apparatus 1500 outputs a result of speech recognition that is robust against event type noise. The speech recognition apparatus 1500 improves a recognition rate through linguistic model based sampling in a situation in which the recognition rate decreases due to noise and other factors.

Figure 16:
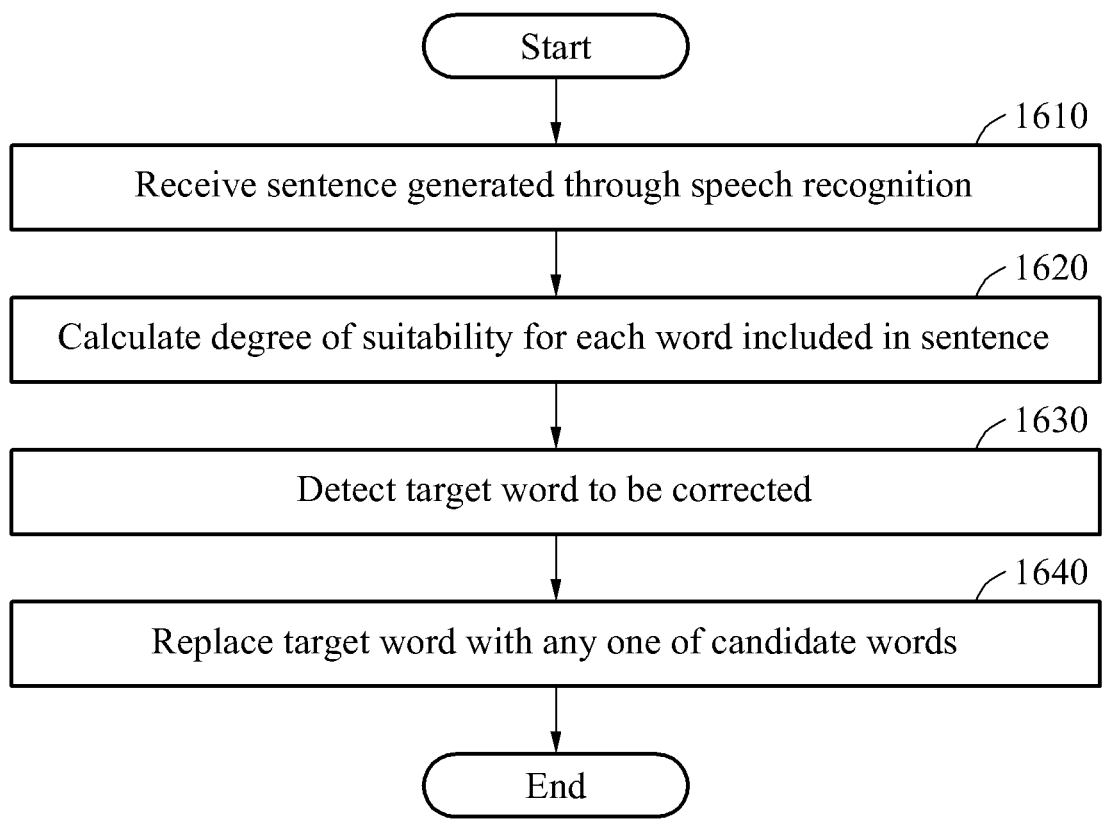
FIGS. 16 through 18 are flowcharts illustrating examples of a speech recognition method.
Figure 17:
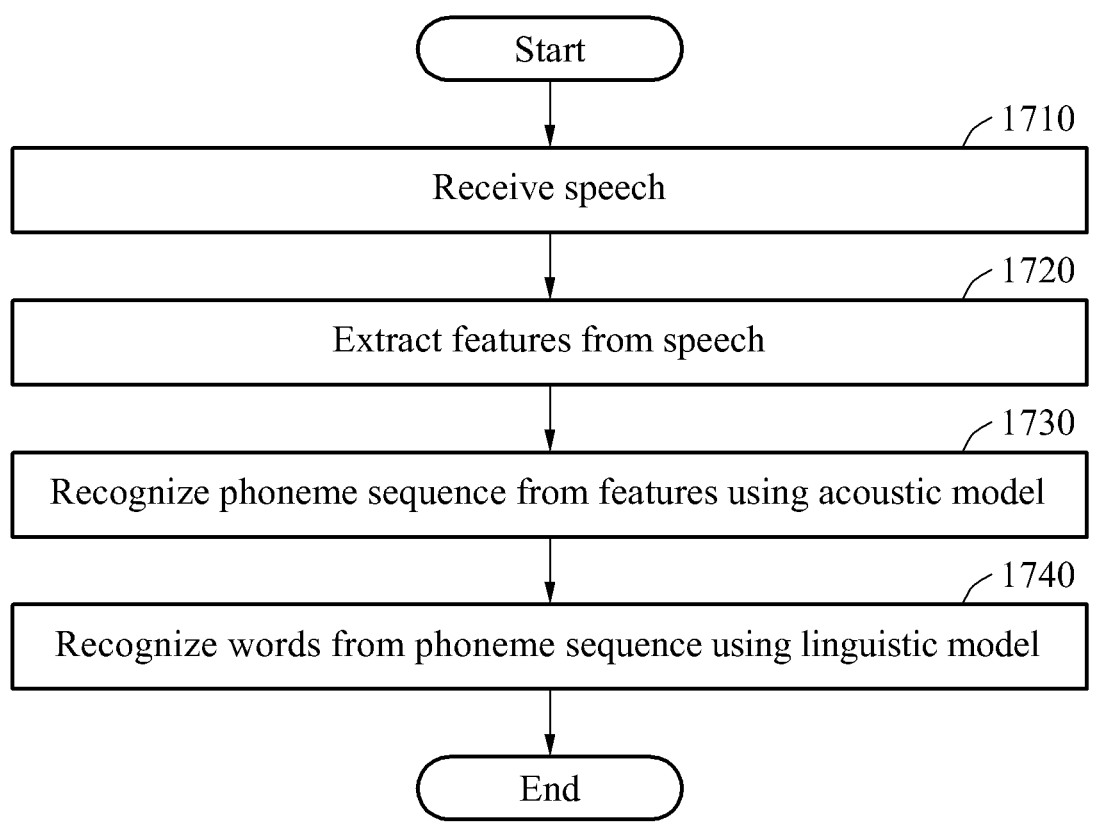
Figure 18:
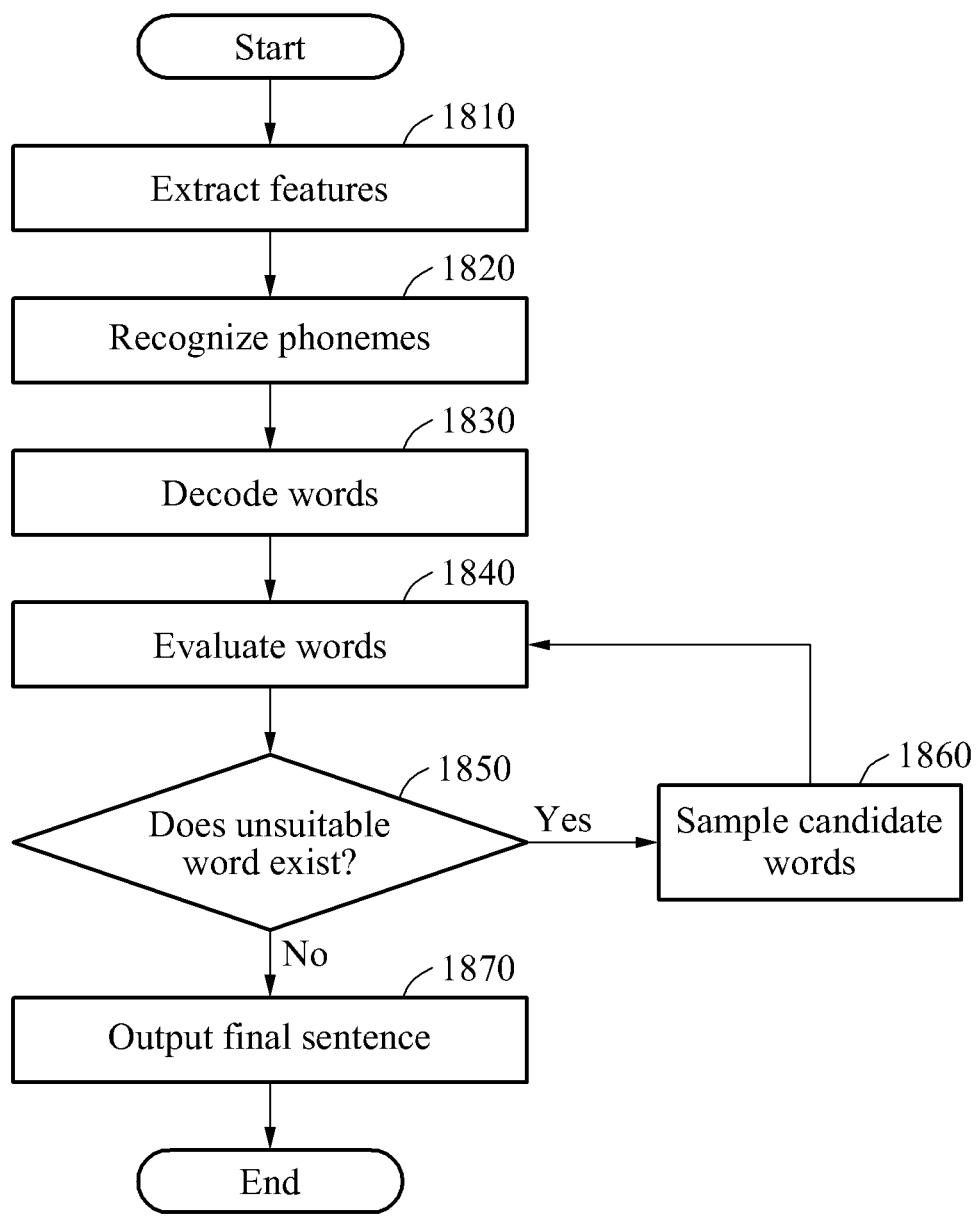

FIGS. 16 through 18 are flowcharts illustrating examples of a speech recognition method.

Referring to FIG. 16, an example of the speech recognition method includes an operation 1610 of receiving a sentence generated through speech recognition, an operation 1620 of calculating a degree of suitability for each word included in the sentence based on a relationship with other words in the sentence, an operation 1630 of detecting a target word to be corrected among words in the sentence based on the calculated degree of suitability for each word, and an operation 1640 of replacing the target word with any one of candidate words corresponding to the target word. The description of the operation of the second recognizer 120 of FIG. 1 is also applicable to the operations illustrated in FIG. 16, and thus a repeated description has been omitted here for brevity.

Referring to FIG. 17, an example of the speech recognition method includes an operation 1710 of receiving speech expressed by a user, operation 1720 of extracting features from the speech, an operation 1730 of recognizing a phoneme sequence from the features using an acoustic model, and an operation 1740 of generating a sentence by recognizing words from the phoneme sequence using a linguistic model. The description of the operation of the first recognizer 110 of FIG. 1 is also applicable to the operations illustrated in FIG. 17, and thus a repeated description has been omitted here for brevity.

Referring to FIG. 18, an example of the speech recognition method includes an operation 1810 of extracting features from speech, an operation 1820 of recognizing phonemes from the features, an operation 1830 of decoding words from the phonemes, an operation 1840 of evaluating the words, an operation 1850 of determining whether an unsuitable word exists, and an operation 1860 of sampling candidate words to replace the unsuitable word in response to the existence of the unsuitable word.

In greater detail, in operation 1840, an optimal candidate word is selected to replace the unsuitable word by evaluating the sampled candidate words. Operations 1840 through 1860 are repeated until an unsuitable word no longer exists. In operation 1870, when the unsuitable word does not exist, an optimal sentence is output.

The description of the operation of the speech recognition apparatus 1500 of FIG. 15 is also applicable to the operations illustrated in FIG. 18, and thus a repeated description has been omitted here for brevity.

The speech recognition apparatus 100, the first recognizer 110, and the second recognizer 120 in FIG. 1, the first recognizer 110 and the second recognizer 120 in FIG. 7, the second recognizer 120, the calculator 121, the detector 122, and the replacer 123 in FIG. 8, the bidirectional recurrent neural network linguistic model in FIG. 9A, the first recognizer 110, the receiver 111, the extractor 112, the decoder 113, and the generator 114 in FIG. 14, and the speech recognition apparatus 1500, the feature extractor 1510, the phoneme recognizer 1520, the acoustic model 1525, the decoder 1530, the first linguistic model 1535, the evaluator 1540, the second linguistic model 1545, the sampler 1550 in FIG. 15 that perform the operations described herein with respect to FIGS. 1-18 are implemented by hardware components. Examples of hardware components include controllers, sensors, generators, analog-to-digital (A/D) converters, digital-to-analog (D/A converters), and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-18. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 16-18 that perform the operations described herein with respect to FIGS. 1-18 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented speech recognition method, comprising:
   receiving a recognized sentence generated through speech recognition;
   evaluating the recognized sentence by calculating degrees of suitability for words, of the recognized sentence, based on a context of the recognized sentence using a language model;
   selecting, based on the calculated degrees of suitability, a target incorrect word in the recognized sentence to be corrected among other words in the recognized sentence;
   sampling candidate words, dependent on the selecting of the target incorrect word, by calculating degrees of suitability for the candidate words based on the context of the recognized sentence using the language model;
   selecting, dependent on the sampling of the candidate words, at least one of the sampled candidate words by calculating degrees of similarity of phoneme sequences of the sampled candidate words to a phoneme sequence of the target incorrect word based on an acoustic model; and
   revising the recognized sentence by replacing the target incorrect word with the selected at least one sampled candidate word.

2. The method of claim 1, wherein the sampling of the candidate words comprises:
   calculating first scores for the candidate words based on the acoustic model, and second scores for the candidate words based on the language model;
   setting a first weighted value to be applied to the first scores and a second weighted value to be applied to the second scores; and
   calculating the degrees of suitability for the candidate words based on the first scores, the second scores, the first weighted value, and the second weighted value.

3. The method of claim 2, wherein the setting of the first weighted value and the second weighted value comprises dynamically, based on a probability distribution of results of the acoustic model associated with the recognized sentence, controlling the first weighted value and the second weighted value.

4. The method of claim 2, wherein the calculating of the first scores and the second scores comprises:
   calculating the first scores based on degrees of similarity of phoneme sequences of the candidate words to a phoneme sequence of the target incorrect word; and
   calculating the second scores based on relationships of the candidate words with the other words in the recognized sentence exclusive of the target incorrect word.

5. The method of claim 1, wherein the language model comprises a bidirectional recurrent neural network language model.

6. The method of claim 1, wherein the selecting of the target incorrect word comprises:
   selecting words having a lower degree of suitability than a predetermined threshold value; and
   selecting a predetermined number of words, in order, starting from a lowest degree of suitability, for generating plural candidate sentences in order with respective target incorrect word replacements.

7. The method of claim 1, further comprising:
   obtaining the sampled candidate words from a pre-provided dictionary.

8. The method of claim 1, further comprising:
   receiving speech expressed by a user;
   extracting features from the received speech;
   recognizing a phoneme sequence from the features using the acoustic model; and
   generating the recognized sentence by recognizing words from the phoneme sequence using a second language model.

9. The method of claim 8, wherein the second language model comprises a bigram neural network language model.

10. A non-transitory computer-readable storage medium storing instructions to cause computing hardware to perform the method of claim 1.

11. A speech recognition apparatus comprising:
    a processor configured to:
      perform a first recognition to generate a recognized sentence by recognizing speech expressed by a user; and
      perform a second recognition correcting at least one target incorrect word of the recognized sentence using sampled candidate words, including
        determining the target incorrect word for replacement in the recognized sentence, from among other words in the recognized sentence, based on an evaluation of words of the recognized sentence using a language model,
        sampling the candidate words through a calculating of processor evaluated suitabilities of the candidate words based on a context of the recognized sentence using the language model, and correcting the target incorrect word of the recognized sentence through a selecting by the processor of at least one of the sampled candidate words by calculating degrees of similarity of phoneme sequences the sampled candidate words to a phoneme sequence of the target incorrect word based on an acoustic model.

12. The apparatus of claim 11, wherein the processor is further configured to:
calculate first scores for the candidate words based on the acoustic model, and second scores for the candidate words based on the language model;
set a first weighted value to be applied to the first scores and a second weighted value to be applied to the second scores; and
calculate degrees of suitability for the candidate words based on the first scores, the second scores, the first weighted value, and the second weighted value.

13. The apparatus of claim 12, wherein the processor is further configured to:
dynamically, based on a probability distribution of results of the acoustic model associated with the recognized sentence, control the first weighted value and the second weighted value.

14. The apparatus of claim 12, wherein the processor is further configured to:
calculate the first scores based on degrees of similarity of phoneme sequences of the candidate words to a phoneme sequence of the target incorrect word; and
calculate the second scores based on relationships of the candidate words with the other words in the recognized sentence exclusive of the target incorrect word.

15. The apparatus of claim 11, wherein the language model comprises a bidirectional recurrent neural network language model.

16. The apparatus of claim 11, wherein, for performing the first recognition, the processor comprises:
a receiver configured to receive the speech;
an extractor configured to extract features from the received speech;
a decoder configured to decode a phoneme sequence from the features; and
a generator configured to generate the recognized sentence by recognizing words from the phoneme sequence.

17. The apparatus of claim 11, wherein, for performing the second recognition, the processor comprises:
a calculator configured to perform the evaluation of the recognized sentence, including calculating degrees of suitability for the words in the recognized sentence based on a relationship of a corresponding word in the recognized sentence with the other words in the recognized sentence;
a detector configured to determine the target incorrect word from among the words in the recognized sentence based on the calculated degrees of suitability for the words; and
a replacer configured to replace the target incorrect word with the selected at least one of the sampled candidate words.

18. The apparatus of claim 17, wherein, in determining the target incorrect word, the detector is further configured to identify words having a lower degree of suitability than a predetermined threshold value, and determine a predetermined number of words, in order, starting from a lowest degree of suitability for generating plural candidate sentences in order with respective target incorrect word replacements.

19. The apparatus of claim 17, wherein the replacer is further configured to perform the sampling of the candidate words based on any one or any combination of any two or more of respective relationships of one or more candidate words with the other words in the recognized sentence exclusive of the target incorrect word, respective degrees of similarity of phoneme sequences of the one or more candidate words to a phoneme sequence of the target incorrect word, and a context of another recognized sentence preceding the recognized sentence.

20. The apparatus of claim 19, wherein the replacer is further configured to obtain the sampled candidate words from a pre-provided dictionary.

* * * * *